US008823503B2

(12) United States Patent
Hofmann

(10) Patent No.: US 8,823,503 B2
(45) Date of Patent: Sep. 2, 2014

(54) MOTOR VEHICLE WITH A HIGH-VOLTAGE SOURCE

(75) Inventor: Reinhard Hofmann, Kipfenberg (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 13/823,626

(22) PCT Filed: Jun. 10, 2011

(86) PCT No.: PCT/EP2011/002851
§ 371 (c)(1),
(2), (4) Date: Mar. 14, 2013

(87) PCT Pub. No.: WO2012/034609
PCT Pub. Date: Mar. 22, 2012

(65) Prior Publication Data
US 2013/0169426 A1 Jul. 4, 2013

(30) Foreign Application Priority Data
Sep. 15, 2010 (DE) .......................... 10 2010 045 501

(51) Int. Cl.
B60Q 1/00 (2006.01)
B60L 3/12 (2006.01)
B60L 3/00 (2006.01)

(52) U.S. Cl.
CPC ... B60Q 1/00 (2013.01); B60L 3/12 (2013.01); B60L 3/0069 (2013.01); B60L 3/00 (2013.01)
USPC ......................................... 340/438

(58) Field of Classification Search
USPC .................. 340/438, 455; 903/903; 320/104; 180/65.285, 65.29, 65.31; 307/9.1, 307/10.1
See application file for complete search history.

(56) References Cited

U.S. PATENT DOCUMENTS 5,130,659 A * 7/1992 Sloan ........................... 324/435
5,278,452 A 1/1994 Matsumoto et al.
(Continued)

FOREIGN PATENT DOCUMENTS

DE 94 02 378 6/1994
DE 195 39 695 5/1996
(Continued)

OTHER PUBLICATIONS

International Search Report issued by the European Patent Office in International Application PCT/EP2011/002851 on Feb. 16, 2012.

Primary Examiner — Hai Phan
Assistant Examiner — Orlando Bousono
(74) Attorney, Agent, or Firm — Henry M Feiereisen LLC

(57) ABSTRACT

A motor vehicle includes a high-voltage source for supplying consumers of a high-voltage on-board power supply system with electrical energy, an electrical separating device for separating the high-voltage source from the high-voltage on-board power supply system and a signal emission device for indicating the connection state between the high-voltage source and the onboard high-voltage power supply system. The signal emission device is activated for emission of a signal when the high-voltage source is separated from the onboard high-voltage power supply system, and is deactivated when the high-voltage source is connected to the onboard high-voltage power supply system. A non-activated signal emission device indicates a live state of the high-voltage on-board power supply system, thereby ensuring that a safe state of the onboard high-voltage power supply system is not falsely signaled in the event of a failure of the signal emission device, thereby eliminating risk to service personnel.

5 Claims, 1 Drawing Sheet

(56) References Cited

U.S. PATENT DOCUMENTS

| | | | |
|---|---|---|---|
| 5,488,283 A * | 1/1996 | Dougherty et al. | 307/10.1 |
| 5,739,674 A * | 4/1998 | Kawahara et al. | 320/106 |
| 5,757,595 A * | 5/1998 | Ozawa et al. | 340/636.1 |
| 5,781,013 A | 7/1998 | Takahashi | |
| 5,796,232 A * | 8/1998 | Alberter et al. | 318/653 |
| 6,424,157 B1 * | 7/2002 | Gollomp et al. | 324/430 |
| 6,424,511 B1 * | 7/2002 | Levinas | 361/88 |
| 2001/0052760 A1 * | 12/2001 | Amano et al. | 320/163 |
| 2002/0017405 A1 * | 2/2002 | Nada | 180/65.2 |
| 2002/0050742 A1 * | 5/2002 | Schumann et al. | 307/9.1 |
| 2003/0001544 A1 * | 1/2003 | Nakanishi | 320/162 |
| 2003/0032308 A1 * | 2/2003 | Tamai et al. | 439/34 |
| 2003/0102673 A1 * | 6/2003 | Nada | 290/40 C |
| 2003/0184935 A1 * | 10/2003 | Enzinna et al. | 361/72 |
| 2003/0191576 A1 * | 10/2003 | Zarei | 701/105 |
| 2005/0109550 A1 * | 5/2005 | Buglione et al. | 180/65.2 |
| 2005/0280400 A1 * | 12/2005 | Ooiwa | 322/28 |
| 2006/0185917 A1 * | 8/2006 | Ozeki et al. | 180/65.2 |
| 2006/0232235 A1 * | 10/2006 | Iwazawa | 318/376 |
| 2007/0216452 A1 * | 9/2007 | Matsumoto et al. | 327/116 |
| 2007/0222413 A1 | 9/2007 | Kinoshita et al. | |
| 2009/0001926 A1 * | 1/2009 | Sato | 320/102 |
| 2009/0015193 A1 * | 1/2009 | Esaka et al. | 320/103 |
| 2009/0039703 A1 * | 2/2009 | Soma et al. | 307/10.1 |
| 2009/0146588 A1 * | 6/2009 | Okamura | 318/139 |
| 2009/0184578 A1 * | 7/2009 | Owens | 307/10.7 |
| 2010/0006360 A1 * | 1/2010 | Kishimoto | 180/65.285 |
| 2010/0168946 A1 * | 7/2010 | Snyder | 701/22 |
| 2010/0259218 A1 * | 10/2010 | Gale et al. | 320/109 |
| 2010/0259229 A1 * | 10/2010 | Gale et al. | 323/205 |
| 2010/0262314 A1 * | 10/2010 | Gale et al. | 700/295 |
| 2010/0289330 A1 * | 11/2010 | Uchida | 307/9.1 |
| 2011/0046832 A1 * | 2/2011 | Francoeur | 701/22 |

FOREIGN PATENT DOCUMENTS

| | | |
|---|---|---|
| DE | 199 47 406 | 2/2001 |
| DE | 102004002949 | 8/2005 |
| DE | 102006024252 | 1/2008 |
| DE | 102008006223 | 8/2009 |
| DE | 102008035458 | 8/2009 |
| EP | 1 247 686 | 10/2002 |
| JP | 11-266502 | 9/1999 |
| WO | WO 99/50131 | 10/1999 |
| WO | WO 2008/070247 | 6/2008 |

* cited by examiner

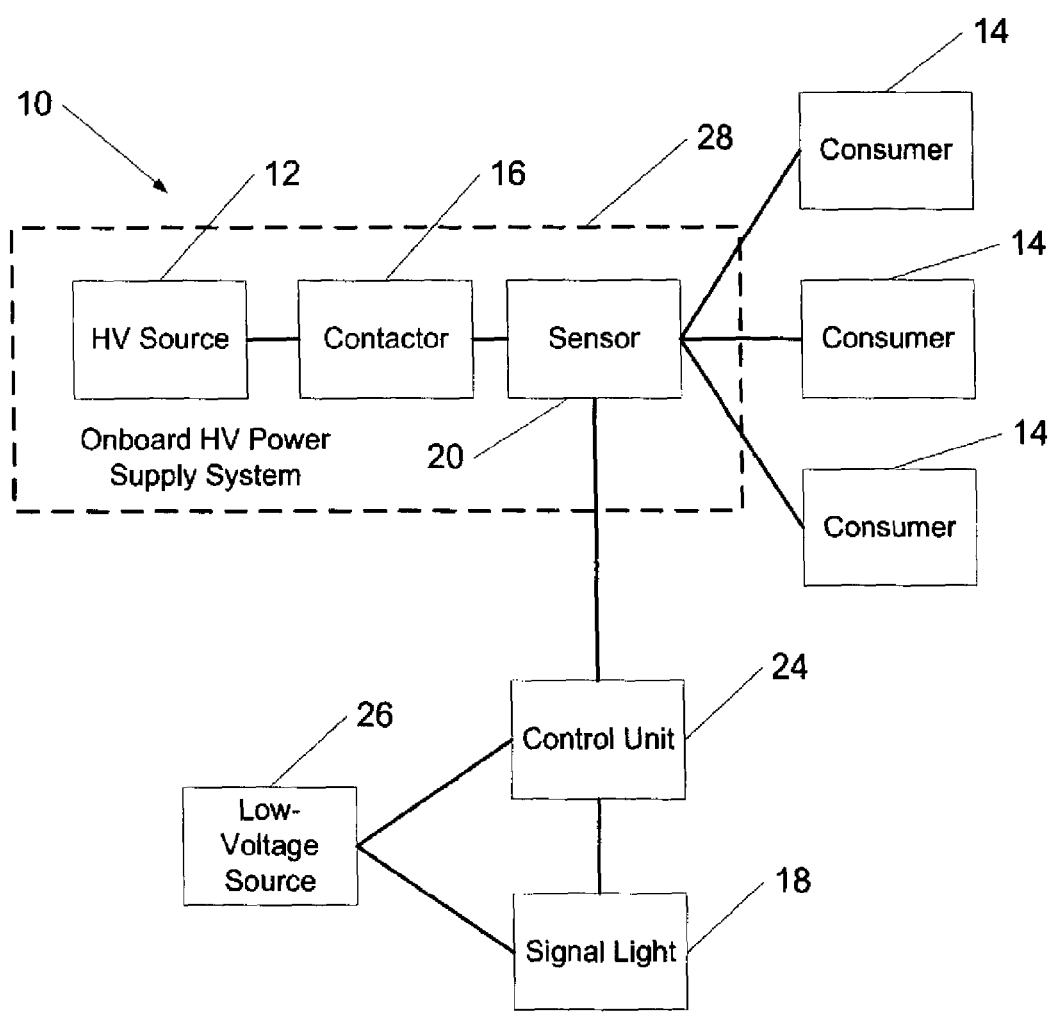

MOTOR VEHICLE WITH A HIGH-VOLTAGE SOURCE

CROSS-REFERENCES TO RELATED APPLICATIONS

This application is the U.S. National Stage of International Application No. PCT/EP2011/002851, filed Jun. 10, 2011, which designated the United States and has been published as International Publication No. WO 2012/034609 and which claims the priority of German Patent Application, Serial No. 10 2010 045 501.6, filed Sept. 15, 2010, pursuant to 35U.S.C. 119(a)-(d).

BACKGROUND OF THE INVENTION

The invention relates to a motor vehicle having a high-voltage source.

High-voltage sources that provide the required electrical energy are required for operating electric machines for electric vehicles and hybrid vehicles. High-voltage hereinafter refers to voltages greater than 60 V which pose a considerable health risk for operators and service personnel upon contact. Currently, typical onboard voltages are approximately 400 V; however, the use of even higher voltages is desirable to limit the currents flowing in the onboard high-voltage system while operating a motor vehicle.

When servicing such vehicle, it must be ensured that the high-voltage source is safely disconnected from the onboard high-voltage system to prevent health risks for the service personnel. Electric vehicles therefore typically have a so-called service connector, wherein removal of this connector cause the high-voltage onboard power supply system to be physically interrupted, thus preventing any current flow. Likewise, it is known to interrupt the onboard high-voltage power supply system by using control devices which separate the high-voltage source from the onboard high-voltage system via one or more contactors.

A signal light is typically provided to indicate to the service personnel that the high-voltage source is disconnected; the signal light turns off when a voltage is no longer present in the onboard high-voltage power supply. However, such signal lamp does not represent a foolproof indication of the zero-voltage state of the onboard high-voltage power supply, since the zero-voltage state cannot be distinguished from a defective signal light.

WO 99/50131 A1 discloses a battery having a disconnectable output; in addition, the battery includes a display device, which emits a signal when switching between the live state and the zero-voltage state, and back. Also, such a display would not enable a reliable detection of the zero-voltage state, but only a change of the state.

It is therefore an object of the present invention to provide a motor vehicle of the aforedescribed type which allows a reliable indication of the zero-voltage state of the onboard high-voltage power supply.

SUMMARY OF THE INVENTION

This object is attained with a motor vehicle having an onboard high-voltage power supply system, a high-voltage source for supplying consumers of the onboard high-voltage power supply system with electrical energy, an electrical disconnection device configured to electrically disconnect the consumers from the onboard high-voltage power supply system, and a signal emission device configured to display a connection state of the high-voltage source with the onboard high-voltage power supply system.

The signal emission device is activated for outputting a predetermined signal when a high-voltage source of the motor vehicle is separated from an onboard high-voltage power supply system of the motor vehicle, and is deactivated, i.e., it does not or cannot output the predetermined signal, when the high-voltage source is connected with the onboard high-voltage power supply. In contrast to conventional motor vehicles, a signal is outputted as long as manipulations on the onboard high-voltage power supply system are considered to be safe as a result of its zero-voltage state. A malfunction of the display device thus does not put the service personnel at risk, because it must be assumed that manipulations on the onboard high-voltage power supply system are not safe, as long as the signal emission device does not output a signal.

In a preferred embodiment of the invention, the signal emission device is connected to an onboard low-voltage power supply. This may be, for example, a 12V power supply system that is separate from the onboard high-voltage power supply. The signal emission device can thus be operated regardless of the connection state of the high-voltage source to the onboard high-voltage power supply. At the same time, the correct operation of the signal emission device can be tested risk free, because no dangerous high-voltages are present.

The low-voltage power supply system preferably includes a measuring device for measuring a voltage in the onboard high-voltage power supply. This can be achieved, on one hand, by measuring a voltage in the onboard high-voltage power supply directly with a voltmeter. However, particularly safe is indirect monitoring of the onboard high-voltage power supply, which can be performed, for example, using inductive measuring devices. In this embodiment, the onboard low-voltage power supply system and the onboard high-voltage power supply system are completely decoupled, thus eliminating the risk of touching live high-voltage parts when performing manipulations in the onboard low-voltage power supply.

The measuring device is preferably configured to transmit signals to a control unit which controls the signal transmitting device depending on the received signals. The control unit may also process other information, for example information relating to the operating state of consumers in the onboard high-voltage power supply, so that a reliable plausibility assessment of the voltage measurement can be made.

The signal emission device is preferably implemented as a signal light, as a signal light emitting diode, and the like. Such visual signals can be easily perceived by the service personnel and allow a quick check of the state of the onboard high-voltage power supply.

In another preferred embodiment of the invention, the signal emission device is arranged on the high-voltage source itself. The signal emission device is therefore always in view of the service personnel during manipulations on the onboard high-voltage power supply, so that the service personnel is always informed about the safe or unsafe state of the onboard high-voltage power supply.

Alternatively, the signal emission device may also be arranged in the region of a service plug for interrupting the high-voltage supply. When pulling the service plug, the service personnel thus already receives reliable information whether removal of the service plug actually interrupts of the onboard high-voltage power supply.

BRIEF DESCRIPTION OF THE DRAWING

The invention and its embodiments will now be explained in more detail with reference to the drawing.

FIG. 1 shows a schematic representation of an onboard power supply system of an exemplary embodiment of a motor vehicle according to the invention.

DETAILED DESCRIPTION OF PREFERRED EMBODIMENTS

An onboard high-voltage power supply system of a motor vehicle, designated overall by the reference symbol 10, includes a high-voltage source 12 in the form of a battery and several consumers 14, which may be, for example, electrical power units, air conditioning units and the like. The high-voltage source 12 provides a voltage greater than 60 V, in particular of about 400 V, which may cause health-related injuries when touched by service personnel.

To enable safe maintenance work on the onboard high-voltage power supply system 10 and the consumers 14, the high-voltage source 12 can be disconnected from the onboard high-voltage power supply system by a contactor 16. To ensure the safety of service personnel, the disconnected state of the battery 12 is indicated by a signal light 18. Manipulations on the onboard high-voltage power supply system 10 are safe as long as the signal light 18 emits a signal. The state of the onboard high-voltage power supply system 10 is monitored by a sensor 20, which may be, for example, a voltmeter. Measured values from the sensor 20 are transmitted over a bus 22 to a control unit 24 which controls the signal light 18. A low-voltage source 26, for example a standard 12 volt battery, provides electric power to the signal light 18 and the control unit 24.

To further enhance the safety, the battery 12, the contactor 16, and the sensor 20 are encapsulated in a common battery housing 28. When the contactor 16 is open, all components of the high-voltage power supply system 10 that are arranged outside of the battery housing 28 are certain to have zero-current and zero-voltage, so that maintenance work on these components can be safely performed.

The signal light 18 may be arranged, for example, directly on the battery housing 28 so that the signal is always in view of the service personnel when manipulating the onboard high-voltage power supply. Of course, other mounting locations of the signal light 18 are conceivable. For example, the signal light 18 may be arranged in the region of a service plug provided for disconnecting the high-voltage power supply system 10. Furthermore, several signal lights 18 may be used at different positions of the motor vehicle, wherein it is particularly advantageous when at least a signal lamp 18 can be viewed from each location at which the service personnel performs work on the onboard high-voltage power supply system 10, so that it can be checked at each process step whether the onboard high-voltage power supply system 10 is in fact at zero voltage.

The invention claimed is:

1. A motor vehicle comprising:
   an onboard high-voltage power supply system,
   a high-voltage source for supplying consumers of the onboard high-voltage power supply system with electrical energy,
   an electrical disconnection device configured to electrically disconnect the consumers from the onboard high-voltage power supply system to enable safe maintenance work on the onboard high-voltage power supply system,
   a measuring device for inductively measuring a voltage in the onboard high-voltage power supply system,
   a plurality of signal emission devices arranged at different positions of the motor vehicle and connected to the inductive measuring device and configured to display a connection state of the high-voltage source with the onboard high-voltage power supply system, and
   an onboard low-voltage power supply connected to the signal emission devices,
   wherein the signal emission devices are activated for outputting a predetermined signal when the high-voltage source is disconnected from the onboard high-voltage power supply system during maintenance work and the onboard high-voltage power supply system has zero voltage, and wherein the signal emission devices are deactivated and do not output the predetermined signal or are unable to output the predetermined signal, when the high-voltage source is connected to the onboard high-voltage power supply system during maintenance work and the onboard high-voltage power supply system has a non-zero voltage.

2. The motor vehicle of claim 1, wherein the measuring device is configured to transmit signals to a control unit, which controls the signal emission devices depending on the received signals.

3. The motor vehicle of claim 1, wherein the signal emission devices comprise at least one of a signal lamp and a signal light emitting diode.

4. The motor vehicle of claim 1, wherein the signal emission devices are arranged on the high-voltage source.

5. The motor vehicle of claim 1, further comprising a service plug for interrupting the high-voltage power supply system, wherein the signal emission devices are arranged in the region of the onboard high-voltage power supply system.

\* \* \* \* \*